United States Patent
Nakata et al.

(10) Patent No.: US 8,497,326 B2
(45) Date of Patent: Jul. 30, 2013

(54) ANTISTATIC IONOMER COMPOSITION AND ARTICLES THEREWITH

(75) Inventors: Kazuyuki Nakata, Hockessin, DE (US); David J. Walsh, Chadds Ford, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 915 days.

(21) Appl. No.: 12/207,258

(22) Filed: Sep. 9, 2008

(65) Prior Publication Data

US 2010/0062275 A1    Mar. 11, 2010

(51) Int. Cl.
*B32B 27/00* (2006.01)
*C08F 20/04* (2006.01)
*C08L 29/04* (2006.01)

(52) U.S. Cl.
USPC ............. 525/330.6; 528/500; 260/DIG. 20; 524/910; 524/394

(58) Field of Classification Search
USPC . 525/330.6; 428/500; 260/DIG. 20; 524/910, 524/394
See application file for complete search history.

(56) References Cited

U.S. PATENT DOCUMENTS

| 3,262,272 A | 7/1966 | Barakauskas |
| 5,179,168 A * | 1/1993 | Hirasawa ............... 525/221 |

FOREIGN PATENT DOCUMENTS

| EP | 0419274 A2 | 3/1991 |
| JP | 02-28919 B | 7/1984 |
| JP | 60-240704 A | 11/1985 |
| JP | 61-044646 A | 3/1986 |
| JP | 61082768 * | 4/1986 |
| JP | 61-163853 A | 7/1986 |
| JP | 10-193495 A | 7/1998 |
| JP | 3878268 B | 2/2007 |
| WO | 2004/060668 A1 | 7/2004 |
| WO | 2004050362 A1 | 7/2004 |
| WO | 2007/075775 A1 | 7/2007 |

OTHER PUBLICATIONS

Full Translation of JP61082768 (1992).*
H. Tachino, et al. Polymer Journal, 1994, 26, 10, pp. 1170-1178.

* cited by examiner

*Primary Examiner* — Mark Kaucher

(57) ABSTRACT

Disclosed are ionomer compositions neutralized by a combination of cesium and potassium that have antistatic properties. Also disclosed are articles, including laminates and monolayer or multilayer structures comprising such compositions to which neither powders nor dusts easily adhere electrostatically.

20 Claims, No Drawings

ANTISTATIC IONOMER COMPOSITION AND ARTICLES THEREWITH

This invention relates to an antistatic ionomer composition and an article therewith.

BACKGROUND OF THE INVENTION

Generally, a fabricated article made from a polymeric material may become statically charged, and the surface may attract and hold charged particles such as dust in the air. In some cases an article may become damaged and/or otherwise devalued by the adhesion of electrostatically charged species. In other cases, such as in the packaging of powders, the powder may adhere to the packaging material. In addition to electrostatic adhesion, the buildup of excessive static charge on articles may result in damage to the article and/or its surroundings due to sparks and other rapid electrostatic discharges.

To prevent adhesion of charged particles, various approaches for preventing surface static charge buildup have been disclosed. For example, an antistatic agent or an antistatic polymer may be applied to the surface, or diffuse from the bulk composition to the surface, of an article as a way of preventing build-up of static charge on an article. See, for example, JP02-28919B, JP 61-44646A, and JP 10-193495A.

Use of surface-applied antistatic agents may introduce potential contamination of materials that come in contact with the surface-applied antistatic agent. Other drawbacks include situations wherein the applied film is inadequate in mechanical properties and could be easily damaged, has poor water resistance, or becomes tacky due to absorption of water. Attempts have been made to provide an antistatic polymer layer not as a surface layer, but as an inner layer with another polymer layer on the surface of the material.

Alternatively, antistatic agents may be incorporated into the composition of a molded article. However, materials that come in contact with the composition may become contaminated due to bleeding of the antistatic agent out of the composition and/or the antistatic effect may deteriorate with time. Permanent, non-diffusing antistatic agents avoid many of these problems.

Films containing ionomers can also be used for antistatic purpose. Ionomers have solid-state properties characteristic of cross-linked polymers and melt-fabricability properties characteristic of uncrosslinked thermoplastic polymers (see, e.g., U.S. Pat. No. 3,262,272). Ionomers may be prepared from copolymers of ethylene with an unsaturated carboxylic acid and optionally a softening comonomer. At least one alkali metal, transition metal, or alkaline earth metal cation, such as lithium, sodium, potassium, magnesium, calcium, or zinc, or a combination of such cations, is used to neutralize some portion of the acidic groups in the copolymer.

Neutralized (for example, greater than about 65%) potassium ionomer compositions or a cesium ionomer composition have been reported to exhibit good antistatic (surface resistivity) properties (H. Tachino, et al. *Polymer Journal*, 1994, 26, 10, pp 1170-1178).

An antistatic resin used as a packaging material or a coating material is disclosed. The resin comprises a copolymer of ethylene with an unsaturated carboxylic acid of which part or the whole is in the form of an alkali metal salt (see, e.g., JP60-240704; JP61-163853).

As the percentage of neutralized acidic groups increases, melt flow of potassium ionomer compositions may be dramatically reduced. Depending on the ethylene copolymer, high neutralization levels may result in compositions that do not flow in the melt. Using acid copolymers with high melt flow indices (low molecular weight) prior to neutralization provides some ability to maintain melt flow at higher neutralization levels. Such acid copolymers are difficult to manufacture and process. High melt flow acid copolymers may also react with ion sources only with difficulty because of low mixing shear. Also, mechanical properties (such as brittleness, especially at low temperatures) may be negatively affected using very high melt flow acid copolymers.

Highly neutralized ionomers may be modified with organic acids that may provide improved properties while retaining melt flowability. For example, WO2004/050362 discloses an antistatic composition comprising a blend of at least one E/X/Y copolymer (E is ethylene, X is a $C_3$-$C_8$ $\alpha,\beta$ ethylenically unsaturated carboxylic acid, and Y is a softening comonomer), and one or more organic acids or salts thereof where the combined carboxylic acid moieties in all ingredients in the blend are at least partially neutralized by potassium.

It is desirable to develop ionomeric compositions that provide antistatic properties while retaining sufficient melt-fabricability or melt processing properties, without adding low molecular weight species or using base resins with extremely high melt index, to allow them to be processed as thermoplastic materials.

SUMMARY OF THE INVENTION

The invention provides an electrostatic dissipative composition comprising an ionomer comprising at least one E/X/Y copolymer wherein E is ethylene, X is a $C_3$ to $C_8$ $\alpha,\beta$ ethylenically unsaturated carboxylic acid, and Y is a softening comonomer including or selected from alkyl acrylate and alkyl methacrylate wherein the alkyl group of the comonomer can have 1 to 8 carbon atoms; X can be from about 12 to about 30 weight % of the E/X/Y copolymer and Y can be from 0 to about 40 weight % of the E/X/Y copolymer; and the copolymer can have a melt index from about 100 to about 1000 g/10 min at 190° C. with a weight of 2.16 Kg.

About 10 to 60 mol % of the total carboxylic acid moieties can be neutralized by cesium and at least 40 mol % of the total carboxylic acid moieties can be neutralized by potassium so that at least 80% of the total carboxylic acid moieties can be neutralized;

The composition can have a melt index of at least 0.1 g/10 min at 190° C. with a weight of 2.16 Kg and a surface resistivity of less than $1 \times 10^{12}$ ohm/square or less than $1 \times 10^{11}$ ohm/square, measured at 23° C. at 50% relative humidity (RH).

The composition may have surface resistivity less than $1 \times 10^{13}$ ohm/sq (preferably less than $1 \times 10^{12}$) at 30% RH.

The invention also provides an article, such as a film, sheet, multilayer laminate or molded part comprising the composition above.

DETAILED DESCRIPTION OF THE INVENTION

All references disclosed herein are incorporated by reference.

Unless stated otherwise, all percentages, parts, ratios, etc., are by weight.

"(Meth)acrylic acid" refers to methacrylic acid and/or acrylic acid, inclusively and "(meth)acrylate" means methacrylate and/or acrylate.

"Cesium-potassium ionomer" refers to an ionomer partially neutralized with cesium and partially neutralized with potassium, as defined above in the Summary of the Invention.

Unlike ionomers neutralized by potassium, cesium ionomers without added modifiers may be brought to very high neutralization levels (>95%) and still maintain melt flow.

When ionomers are neutralized with a combination of cesium and potassium cations, the same benefits of good melt flow and antistatic properties may be obtained. This composition exhibits improved antistatic performance, especially at high relative humidity, but even at low relative humidity.

Other properties such as clarity, toughness, resilience are also known to improve with higher neutralization levels. Ionomers partially neutralized with cesium in combination with potassium may also exhibit improvement in these properties in addition to the improved antistatic properties.

Acid copolymer ionomers ("ionomers") are ionic copolymers prepared from an ethylene/unsaturated acid copolymer wherein at least some of the carboxylic acid moieties in the copolymer are neutralized to form the corresponding carboxylate salts.

The acid copolymers used to make the compositions described herein are preferably "direct" acid copolymers. "Direct" copolymers are polymers polymerized by adding all monomers simultaneously and the copolymerized monomers are part of the polymer backbone or chain. In contrast, in graft copolymers, another comonomer is attached to non-terminal repeat units in an existing polymer chain, often by a subsequent free radical reaction.

The acid copolymers are preferably alpha olefin, particularly ethylene, $C_{3-8}$ $\alpha,\beta$ ethylenically unsaturated carboxylic acid, particularly acrylic and methacrylic acid, copolymers. They may optionally contain a third softening monomer. Softening means that a polymer is made less crystalline. When a softening comonomer is included, the ionomer resulting after neutralization is softer. Suitable examples of "softening" comonomers are monomers selected from the group consisting of alkyl acrylate and alkyl methacrylate, wherein the alkyl groups have from 1 to 8 carbon atoms.

Ethylene acid copolymers may be described as E/X/Y copolymers where E represents copolymerized units of ethylene, X represents copolymerized units of the $\alpha,\beta$ ethylenically unsaturated carboxylic acid, and Y represents copolymerized units of a softening comonomer. X is from about 12 to about 30 weight % of the E/X/Y copolymer and Y is from 0 to about 40 or about 0.1 weight % to about 40 weight % of the E/X/Y copolymer.

X can be from about 15 to about 25 (or about 30) weight % of the copolymer. Of note are copolymers wherein X is from about 15 to about 25 weight % of the copolymer and the amount of Y is 0. When present, Y may be about 5 to about 20 weight % of the copolymer and preferably Y is alkyl acrylate and alkyl methacrylate, wherein the alkyl groups have from 1 to 8 carbon atoms (more preferably 1 to 4 carbon atoms). Of note are copolymers wherein X is from about 15 to about 25 weight % of the copolymer and the amount of Y is from about 5 to about 20 weight % of the copolymer.

Ethylene acid copolymers may be made by any suitable method. Ethylene acid copolymers with higher levels of acid may be prepared by use of "co-solvent technology" as described in U.S. Pat. No. 5,028,674 or by employing somewhat higher pressures than those at which copolymers with lower acid may be prepared.

The ethylene acid copolymers may have a melt index from about 100 to about 600, to about 800 or to about 1000 g/10 min at 190° C. with a weight of 2.16 Kg.

Ionomers may be prepared from the acid copolymers described above by methods known in the art of preparing ionomers, such as disclosed in U.S. Pat. No. 3,262,272.

An ionomer may comprise at least one E/X/Y or E/X copolymer as disclosed above. A mixture of two or more different acid copolymers may be used in the ionomer composition in place of a single copolymer. Particularly useful properties may be obtained when two or more properly selected acid copolymers are used.

At least 80% of the acid moieties of the acid copolymer are nominally neutralized by a combination of potassium and cesium, such that in the final ionomer from 10 to 60 mol % of the total carboxylic acid moieties are neutralized by cesium and at least 40% of the total carboxylic acid moieties are neutralized by potassium. Preferably about 80 to about 95%, or about 90 to about 95%, or even 100%, of the acid moieties of the acid copolymer are nominally neutralized. Preferably 20 to 60 mol % of the acid moieties are neutralized by cesium.

Neutralizing agents, which for the purposes of this application are basic compounds containing cesium or potassium ions, are used to neutralize at least some portion of the acidic groups in the acid copolymer. The amount of basic metal compound capable of neutralizing acidic groups in the acid copolymer may be provided by adding the stoichiometric amount of the basic compounds calculated to neutralize a target amount of acid moieties in the acid copolymer (herein referred to as "% nominal neutralization" or "nominally neutralized"). Thus, sufficient basic compounds are made available so that, in aggregate, the indicated level of nominal neutralization could be achieved.

Suitable basic compounds include compounds of potassium and cesium, such as cesium or potassium formates, acetates, carbonates, hydrogencarbonates, oxides, hydroxides or alkoxides. Of note is cesium hydroxide, cesium acetate, cesium carbonate, potassium hydroxide, potassium acetate, potassium carbonate, or combinations of two or more thereof.

The basic compounds may be added neat to the acid copolymer or in aqueous solution. For example, an acid copolymer may be neutralized by a combination of neutralizing agents such that after neutralization from 10 to 60 mol % of the total carboxylic acid moieties are neutralized by cesium and at least 40% of the total carboxylic acid moieties are neutralized by potassium.

The basic compounds may also be premixed with a polymeric material, such as a different acid copolymer or another copolymer having a higher melt index, to form a "masterbatch" that may be added to the acid copolymer to be neutralized.

Alternatively, the antistatic composition may be conveniently prepared by obtaining a potassium ionomer and further neutralizing the ionomer with cesium ions. Suitable potassium ionomers are known and commercially available from E. I. du Pont de Nemours and Company, Wilmington, Del., USA (DuPont).

These compositions may exhibit improved charge dissipation over compositions that are not partially neutralized with cesium (i.e. neutralized only with potassium to the same level), with better melt flow.

Alternatively, highly neutralized ionomers may be prepared by saponification of ethylene alkyl acrylate or ethylene alkyl methacrylate copolymers. For example, ethylene methyl(meth)acrylate, ethylene ethyl(meth)acrylate, or ethylene butyl(meth)acrylate copolymers may be treated with KOH and/or CsOH, and/or their water solutions to saponify at least a portion of the ester moieties in the copolymers. If the saponification reaction is quenched without neutralization of the resulting polymeric carboxylic salts, the resulting ionomer may be obtained at essentially 100% neutralization. The amount of base may be adjusted to saponify either a portion of the ester moieties or all of the ester moieties in the copolymer. When only a portion of the ester moieties are saponified, the resulting ionomer may be considered an E/X/Y copolymer wherein X represents copolymerized units of acrylic acid or methacrylate acid moieties (which are 100% neutralized) and Y represents copolymerized units of alkyl acrylic or alkyl methacrylate (remaining from the original polymer).

Other materials (e.g. additives or other polymers as described below) may be also uniformly dispersed in the cesium-potassium ionomer. The blend may be obtained by combining the component materials using any melt-mixing method known in the art. For example: 1) the component materials may be mixed using a melt-mixer such as a single or twin-screw extruder, blender, kneader, Banbury mixer, roll mixer, etc., to give the antistatic composition; or 2) a portion of the component materials may be mixed in a melt-mixer, and the rest of the component materials subsequently added and further melt-mixed. After blending, the composition may be processed directly into a finished article through, for example, extrusion molding, coextrusion molding, extrusion lamination, extrusion coating, cast film extrusion, blown film extrusion or the like.

The antistatic compositions may optionally comprise other thermoplastic polymers or other optional components. In some cases, these optionally components may be excluded. Compositions described herein may have other desirable properties that could be negatively affected by blending the antistatic composition with other polymeric components. For example, moisture and gas permeability of a film or sheet may be affected in such a blend.

In some cases, compositions may comprise from about 5 to about 90 weight % of additional thermoplastic copolymers (based on the combination of cesium-potassium ionomer and additional polymer) and still exhibit useful antistatic properties.

Optional polymeric components that may be blended with the antistatic composition include non-ionic thermoplastic resins. The non-ionic thermoplastic resins would, by way of non-limiting illustrative examples, include thermoplastic elastomers, such as polyurethanes, poly-ether-esters, poly-amide-ethers, polyether-ureas, PEBAX (a family of block copolymers based on polyether-block-amide, commercially supplied by Arkema); styrene-butadiene-styrene (SBS) block copolymers; styrene(ethylene-butylene)-styrene block copolymers; polyesters; polyamides; polyvinyl alcohol; polyolefins including polyethylene, polypropylene, ethylene/propylene copolymers; ethylene copolymers with polar comonomers, such as vinyl acetate, (meth)acrylates, (meth) acrylic acid, epoxy-functionalized monomer, CO, vinyl alcohol; functionalized polymers with maleic anhydride grafting, epoxidization; elastomers, such as EPDM, metallocene catalyzed PE and copolymer, and ground up powders of thermoset elastomers.

For example, polyethylene may be added to the cesium-potassium ionomer composition. The composition may further comprise polyethylene homopolymers or polyethylene copolymers wherein units derived from ethylene comprise the major portion or percentage by weight of the copolymer. By major portion or percentage is meant about 70 weight %, 80 weight % or more of the copolymer. Examples of polyethylene copolymers are copolymers of ethylene and alpha-olefins, including copolymers with propylene and other alpha-olefins, wherein copolymerized units derived from ethylene comprise the major portion or percentage by weight of the copolymer.

Suitable polyethylene homopolymers and polyethylene copolymers include high density polyethylenes, low density polyethylenes, linear low density polyethylenes, and copolymers of ethylene and alpha-olefin monomers prepared in the presence of metallocene catalysts, single site catalysts or constrained geometry catalysts (hereinafter referred to as metallocene polyethylenes, or MPE).

Polyethylene homopolymers and copolymers may be prepared by a variety of methods. Examples of such processes include, but are not limited to, the well-known Ziegler-Natta catalyst polymerization process (see for example U.S. Pat. No. 4,076,698 and U.S. Pat. No. 3,645,992), metallocene catalyzed polymerization, VERSIPOL single-site catalyst polymerization and free radical polymerization. As used herein, the term metallocene catalyzed polymerization includes polymerization processes that involve the use of metallocene catalysts as well as those processes that involve use of constrained geometry and single-site catalysts. Polymerization may be conducted as a solution-phase process, a gas phase-process and the like.

Without being held to any particular theory, MPE is of note because of its substantially linear structure and narrow molecular weight distribution. Metallocene technology is capable of making lower density polyethylene having high flexibility and low crystallinity. Metallocene technology is described in, for example, U.S. Pat. Nos. 5,272,236, 5,278,272, 5,507,475, 5,264,405 and 5,240,894.

Examples of linear polyethylenes include ethylene copolymers having copolymerized units of alpha-olefin comonomers such as butene, hexene or octene. For example, a copolymer useful as the polyethylene component may comprise a major portion or percentage by weight of copolymerized units of ethylene and a minor portion or percentage by weight of copolymerized units of at least one other alpha-olefin. Suitable alpha-olefins may be selected from the group consisting of alpha-olefins having at least three carbon atoms, preferably from 3 to 20 carbon atoms. These comonomers may be present as copolymerized units in an amount of up to about 20 weight % or 30 weight % of the copolymer. Preferred alpha-olefins include propylene, 1-butene, 1-hexene, 4-methyl-1-pentene, 1-octene, 1-decene, 1-tetradecene and 1-octadecene. Copolymers may be obtained by polymerization of ethylene with two or more alpha-olefins, preferably including propylene, 1-butene, 1-octene and 4-methyl-1-pentene.

Polyethylenes may include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE). The densities of PE suitable for use in the composition range from about 0.865 g/cc to about 0.970 g/cc.

Also contemplated for use as a polyethylene component are blends of two or more of these ethylene alpha-olefin copolymers as well as mixtures of an ethylene homopolymer and one of the suitable ethylene alpha-olefin copolymers.

As used herein, the term "polyethylene" refers to any of the ethylene homopolymers and copolymers described above.

Of note are cesium-potassium ionomer compositions as described herein further comprising from about 1 to about 35 weight % (of the total composition) of polyethylene. Compositions with minor amounts of polyethylene may have improved handling characteristics, such as reduced moisture absorption speed, reduced pellet blocking, and allow for higher drying temperatures. These properties may be useful for processing the cesium-potassium ionomers, such as allowing preparation of a masterbatch that may be further blended with other polymers to make antistatic compositions. Also of note are cesium-potassium ionomer compositions as described herein further comprising from about 50 to about 90 weight % (of the total composition) of polyethylene. These compositions may be useful for making finished articles at lower cost while still maintaining good antistatic performance.

Copolymers of ethylene and polar comonomers may also be included in the cesium-potassium ionomer composition. Ethylene copolymers of note are ethylene vinyl acetate copolymer, ethylene alkyl acrylate copolymers, or ethylene alkyl methacrylate copolymers.

Other optional materials may include conventional additives used in polymeric materials including plasticizers, humectants, stabilizers, antioxidants, ultraviolet ray absorbers, hydrolytic stabilizers, dyes or pigments, fillers, fire-retardants, lubricants, reinforcing agents such as glass fiber and flakes, processing aids, antiblock agents, release agents, and/or mixtures thereof. The amount of optional additives, when used, may vary over a wide range. They may generally be present in quantities from about 0.1 weight % (or less) to about 20 weight % of the polymer composition. Suitable amounts may be those that do not detract from the basic and novel characteristics of the polymer compositions.

Additives such as an antioxidant (e.g., hindered phenols characterized as phenolic compounds that contain sterically bulky radicals in close proximity to the phenolic hydroxyl group) may be used. Hindered phenols may include 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-di-tert-butyl-4-hydroxyphenyl)-propionate; 4,4'-methylenebis(2,6-tert-butyl-phenol); 4,4'-thiobis(8-tert-butyl-o-cresol); 2,6-di-n-tert-butylphenol; 6-(4-hydroxyphenoxy)-2,4-bis(n-octylthio)-1,3,5 triazine; di-n-octylthio)ethyl 3,5-di-tert-butyl-4-hydroxy-benzoate; sorbitol hexa[3-(3,5-di-tert-butyl-4-hydroxy-phenyl)-propionate], or combinations of two or more thereof.

Plasticizers and humectants include polyols such as glycerol, polyglycerol and pentaerythytol; polyalkylene glycols such as polyethylene glycol and polypropylene glycol; and esters of any these polyols such as polyethylene glycol glycerin esters and polyol fatty acid esters such as glycerol monostearate, glycerol distearate and glycerol tristearate.

The cesium-potassium ionomer composition may be used in monolayer structures or multilayer structures having at least two layers to impart its antistatic properties, for example, in packaging applications such as films, containers, pouches and lids.

When used in a packaging application, the multilayer structure may involve at least one of three categorical layers including, but not limited to, an outermost structural or abuse layer, a barrier layer, bulking layer and/or adhesive layer, and an innermost layer making contact with and compatible with the intended contents of the package and capable of forming the necessary seals (e.g. most preferably heat-sealable) to itself and the other parts of the package. Other layers may also be present to serve as adhesive or "tie" layers to help bond these layers together. Outermost and innermost refer to surface layers of the structure that are respectively furthest from or closest to the contents of the package.

The antistatic compositions may be used as a surface layer (a layer of which only one face of the layer contacts another layer; an outermost or innermost layer) of a multilayer structure. An antistatic laminate is a laminate comprising a layered structure comprising at least two layers, one or more of which comprises the antistatic composition; or comprising at least three layers wherein there are two surface layers and an intermediate layer (a layer of which both faces of the layer contact another layer) positioned between the two surface layers, and wherein at least one surface layer comprises the composition. A multilayer structure of note has two surface layers comprising the antistatic composition and at least one intermediate layer.

The antistatic composition may also be used as an intermediate layer of the multilayer laminate, in which the antistatic composition provides a "hidden" antistatic layer. An example is a multilayer structure comprising at least three layers wherein there are two surface layers and an intermediate layer positioned between the two surface layers, and wherein the intermediate layer comprises the composition.

A polymeric material having a surface resistivity of $1 \times 10^{14}$ ohm/sq (measured at 23° C. under an atmosphere of 50% relative humidity) or more may be used for a surface layer or an intermediate layer. Examples thereof include polyethylene (as described above); polypropylene; poly-1-butene; poly-4-methyl-1-pentene; copolymers of ethylene and a polar monomer, for example, an ethylene-vinyl acetate copolymer, copolymers of ethylene and unsaturated carboxylic acid, e.g., acrylic acid, methacrylic acid, monoethyl maleate, maleic anhydride, etc. or their ionomers of Na, Li, K, Zn, Mg, Ca or the like; copolymers of ethylene and at least one kind of unsaturated carboxylic acid ester, for example, methyl acrylate, ethyl acrylate, isobutyl acrylate, n-butyl acrylate, 2-ethylhexyl acrylate, methyl methacrylate, glycidyl methacrylate, dimethyl maleate; copolymers of ethylene, carbon monoxide and, optionally, an unsaturated carboxylic acid ester or vinyl acetate; olefin-based polymers such as polyolefin elastomers; styrene-based polymers such as rubber-reinforced styrene-based resins, for example, polystyrene, high impact polystyrene, ABS resin, etc.; polyesters such as polyethylene terephthalate, polytrimethylene terephthalate, polytetramethylene terephthalate, polyethylene naphthalate, cyclohexanedimethanol-copolymerized polyethylene terephthalate, and polyester elastomers; polycarbonates; polymethyl methacrylate; or mixtures of two or more of them.

An ethylene-based polymer that may be used as either a surface layer or an intermediate layer may be a polyethylene as described above.

A structure where another polymeric material layer or an adhesive layer is formed between at least one of the surface layers and the intermediate layer is contemplated herein.

An adhesive layer may be formed between a surface layer and an intermediate layer and may be any that is capable of improving the adhesion between the surface layer and the intermediate layer. It may be selected from thermoplastic polymers such as those listed above and also may be a hot melt adhesive or application-type adhesives. It may be preferable to use an adhesive capable of being extrusion coated or coextruded selected from thermoplastic polymers and compositions comprising such thermoplastic polymers and tackifiers or the like incorporated thereto.

Anhydride or acid modified ethylene and propylene homo- and co-polymers are used as extrudable adhesive layers (tie layers) to improve bonding of layers of polymers together when the polymers do not adhere well to each other, thus improving the layer-to-layer adhesion in a multilayer structure. The compositions of the tie layers may be determined according to the compositions of the adjoining layers to be bonded in the multilayer structure. Various tie layer compositions are commercially available from DuPont.

Additional layers may optionally include a layer in which recovered wastes such as off-specification products or selvages formed during the production of laminates are used. The material of such a recovery layer may be the same as the material of the surface layer, the intermediate layer or a mixture of these materials. In some cases, a recovery layer comprising such a mixture may provide improved adhesion of the surface layer and the intermediate layer.

Individual layers may incorporate various additives as needed, examples of which include antioxidants, light stabilizers, ultraviolet absorbers, pigments, dyes, lubricants, antiblocking agents, inorganic fillers, foaming agents, etc. For example, it is possible to incorporate an organic or inorganic chemical foaming agent such as azodicarbonamide, dinitrosopentamethylenediamine, sulfonylhydrazide, sodium bicarbonate and ammonium bicarbonate at a ratio of from about 0.1 to about 10 parts by weight per 100 parts by weight of the polymer component constituting a layer.

A laminate film may be prepared by coextrusion as follows. Granulates of the various components are melted in suitable extruders and converted into a film using a converting technique. For coextrusion, the molten polymers are passed through a die or set of dies to form layers of molten polymers that are processed as a laminar flow and then cooled to form a layered structure. A laminate or multilayer structure may also be made by coextrusion followed by lamination onto one or more other layers. Suitable converting techniques include blown film extrusion, cast film extrusion, cast sheet extrusion, extrusion coating and blow molding.

Besides wrapping materials, the laminate may be used for various applications such as base materials of dicing tapes; adhesive tapes or films for semiconductors such as backgrinding films; electric and electronic materials such as marking films, integrated circuit carrier tapes and tapes for taping electronic components; materials for wrapping foods; medical supplies; protection films (e.g., guard films or sheets for boards and lens of glass, plastics or metal); steel-wire covering materials; cleanroom curtains; wallpapers; mats; flooring materials; inner bags of flexible containers; containers; shoes; battery separators; moisture permeable films; antifouling films; dust-proofing films; PVC-free films; tubes, bottles and the like for packing cosmetics, detergents, shampoo, rinse, etc.

Laminates that are excellent in charge decay are capable of preventing dusts and powders from adhering thereto due to charging and consequently are excellent in antifouling properties. Such laminates may be used in the form of a film, a tape, a sheet, a tube, a pipe, a bag, a multilayer container (for example, a container made by blow molding), a rod, various injection-molded articles, various blow-molded articles, etc. Preferred is a laminate in the form of a film, a sheet, a bag or a multilayer container. A molded article having a surface layer with the charge dissipating characteristic, the surface layer forming an outer surface of the article, may be excellent in antifouling property and may avoid soiling of the surface. When the laminate is used as a wrapping material of a powder where it is used in such a manner that the surface layer with the charge dissipating characteristic is an inner surface layer, powder electrostatically adhered to the wrapping material may be avoided such that their commodity value is not deteriorated.

A multilayer blown container may comprise a laminate having as an intermediate or surface layer a layer comprising the antistatic composition. Such multilayer blown container may have an outer surface excellent in slipping property, scratch resistance and antifouling property.

The following Examples are merely illustrative, and not limiting of the disclosure in any way whatsoever. The methods for the evaluation of the raw materials used and the antistatic performances of the resulting laminates in the following Examples and Comparative Examples are shown below.

EXAMPLES

Materials Used

EMAA-1: An ethylene/methacrylic acid (MAA) copolymer with 19 weight % MM and MI of 395 g/10 min.
EMAA-2: An ethylene/methacrylic acid (MAA) copolymer with 15 weight % MM and MI of 200 g/10 min.
EMAA-3: An ethylene/methacrylic acid (MAA) copolymer with 19 weight % MM and MI of 270 g/10 min.
LLDPE-1: A linear low density polyethylene (MI of 1.4 g/10 min., density 0.921 kg/m$^3$) available from NOVA Chemicals under the tradename SCLAIR 11E1.
K-1: A masterbatch comprising 52 weight % $K_2CO_3$ in an ethylene/methyl acrylate copolymer.
Cs-1: $Cs_2CO_3$ (commercial grade).

Using a 30 mm W&P twin-screw extruder, the acid copolymers and neutralizing agents were melt blended using two-pass processing to provide the compositions summarized in Table 1. The temperature of the extruder was set at 220° C. and the screw speed was set at 200 rpm for the first pass and 150 rpm for the second pass. Mixing in this manner provides compositions in which the components were well-blended. The compositions were collected as pellets.

The compositions were then molded into plaques, 3 inch by 3 inch by 0.0625 inch thick (7.6 cm×7.6 cm×1.6 mm), on a 1.5 oz Arberg injection molding machine. The injection molding machine has a relatively short single-screw extruder feed that provides only limited mixing prior to molding.

The surface resistivity test was conducted in compliance with the ASTM D-257 method. Samples were acclimatized for at least 24 hours in a humidity controlled chamber. The surface resistivity of the compositions was measured and reported (the average of at least three replicates per composition) in Table 1, as ohms/square. For an idea of the amount of variability to be expected in a test of this kind, the observed scatter in resistivity in a recent ANSI study was about half an order of magnitude sample to sample. In the tables, "E^x", where x is an integer, is shorthand notation for "times 10$^x$."

Thermoplastic resins are polymeric materials that can flow when heated under pressure. Melt index (MI) is the mass rate of flow of a polymer through a specified capillary under controlled conditions of temperature and pressure and was measured according to ASTM 1238. The MI (g/10 min) in Table 1 was measured at 190° C. using a mass of 2.16 Kg.

In Table 1, "Neut. % of Cs" refers to the percentage of the acid moieties nominally neutralized by cesium, "Neut. % of K" refers to the percentage of the acid moieties nominally neutralized by potassium. "W×N" is the weight % of the acid comonomer (e.g. methacrylic acid) contained in the copolymer times the mol fraction of the acid moieties neutralized by the combination of cesium and potassium.

TABLE 1

|  | Example 1 | Comparative Example C1 | Example 2 | Comparative Example C2 | Example 3 |
|---|---|---|---|---|---|
| Base Resin | EMAA-1 | EMAA-1 | EMAA-2 | EMAA-2 | EMAA-3 |
| Neut. % of Cs | 50 | 0 | 30 | 10 | 45 |
| Neut. % of K | 43 | 90 | 56 | 56 | 46 |
| Total Neut. % | 93 | 90 | 86 | 66 | 91 |
| W × N (%) | 17.7 | 17.1 | 12.9 | 9.9 | 17.29 |

TABLE 1-continued

|  | Example 1 | Comparative Example C1 | Example 2 | Comparative Example C2 | Example 3 |
|---|---|---|---|---|---|
| MI (190° C./2160 g) | 0.26 | 0.04 | 0.51 | 1.7 | 0.24 |
| Surface resistivity (Ω/square) | | | | | |
| 30% RH | 1.3E^8 | 1.9E^11 | 7.3E^10 | 5.1E^15 | 1.8E^8 |
| 50% RH | 1.1E^8 | 2.0E^9 | 1.0E^8 | 1.7E^15 | 2.0E^8 |

Example 1, partially neutralized with cesium, provides both significantly better antistatic performance, as evidenced by surface resistance, and better melt flow than Comparative Example 1, which was not partially neutralized with cesium. Example 2 provides excellent antistatic performance and good melt flow (MI). In contrast, Comparative Example C2, neutralized to a lower mol fraction, has good melt flow but poor antistatic performance.

Additional examples containing a minor amount of LLDPE were prepared by melt blending a salt-and-pepper blend of Example 1 and LLDPE-1, summarized in Table 2. Plaques were injection molded as described above and the surface resistivity is reported.

TABLE 2

|  | Example 4 | Example 5 |
|---|---|---|
| LLDPE-1 | 15 | 30 |
| Example 1 | 85 | 70 |
| MI (190° C./2160 g) | 0.38 | 0.99 |
| Surface resistivity (Ω/square) | | |
| 30% RH | 2.2E^8 | 4.2E^8 |
| 50% RH | 6.2E^7 | 6.8E^7 |

Additional examples containing a major amount of LLDPE were prepared by melt blending a salt-and-pepper blend of Example 3 and LLDPE-1, summarized in Table 3. Plaques were injection molded as described above and the surface resistivity is reported. The data in Table 3 demonstrate that compositions containing as little as 20 weight % of the cesium-potassium ionomer provide good antistatic performance.

TABLE 3

|  | Example 6 | Example 7 | Example 8 | Comparative Example C3 |
|---|---|---|---|---|
| LLDPE-1 | 80 | 80 | 80 | 80 |
| Example 1 | 20 | — | — | — |
| Example 2 | — | 20 | — | — |
| Example 3 | — | — | 20 | — |
| Comparative Example C2 | — | — | — | 20 |
| Surface resistivity (Ω/square) | | | | |
| 30% RH | 1.1E^10 | 8.9E^13 | 3.3E^10 | 7.0E^16 |
| 50% RH | 2.8E^8 | 1.8E^10 | 3.8E^8 | 2.3E^15 |

The invention claimed is:

1. A composition comprising an ionomer wherein the composition is electrostatic dissipative and the ionomer comprises at least one E/X/Y copolymer;
   the composition has a melt index of at least 0.1 g/10 min at 190° C. with a weight of 2.16 Kg;
   the composition has a surface resistivity of less than $1 \times 10^{12}$ ohm/square, measured at 23° C. at 50% relative humidity;
   E is ethylene, X is a $C_3$ to $C_8$ α,β ethylenically unsaturated carboxylic acid, and Y is alkyl acrylate or alkyl methacrylate and, based on the weight of the copolymer, is present in the copolymer from about 0 to about 40%; and
   at least 80% of the total acid moieties in the copolymer are neutralized with cesium and potassium.

2. The composition of claim 1 wherein the composition has a surface resistivity of less than $1 \times 10^{11}$ ohm/square and from 10 to 60 mol % of the total carboxylic acid moieties are neutralized by cesium and at least 40 mol % of the total carboxylic acid moieties are neutralized by potassium.

3. The composition of claim 2 wherein the composition has a surface resistivity of less than $1 \times 10^{13}$ ohm/square, measured at 23° C. at 30% relative humidity and the E/X/Y copolymer does not contain Y.

4. The composition of claim 3 wherein the composition has a surface resistivity of less than $1 \times 10^{12}$ ohm/square, measured at 23° C. at 30% relative humidity.

5. The composition of claim 2 wherein the weight % of X in the copolymer multiplied by the mol fraction of the total carboxylic acid moieties that are neutralized is greater than or equal to 12%.

6. The composition of claim 2 wherein
   the composition further comprises one or more additional polymers;
   the additional polymer includes thermoplastic elastomer, styrene-butadiene-styrene block copolymer, styrene (ethylene-butylene)-styrene block copolymer, polyesters, polyamides, polyvinyl alcohol, polyolefin, ethylene copolymer, functionalized polymer, EPDM, or ground up powders of thermoset elastomer;
   the thermoplastic elastomer is polyurethane, polyetheresters, polyamideethers, polyetherureas, or block copolymer based on polyether-block-amide;
   the polyolefin is polyethylene, polypropylene, or ethylene/propylene copolymer;
   the ethylene copolymer comprises a polar comonomer including vinyl acetate, alkyl acrylates, alkyl methacrylate, epoxy-functionalized monomer, CO, or vinyl alcohol; and
   the functionalized polymer with maleic anhydride grafting or epoxidization.

7. The composition of claim 6 wherein the additional polymer is polyethylene.

8. The composition of claim 7 wherein the polyethylene is present in the composition in the range of about 1 to about 35 weight %.

9. The composition of claim 7 wherein the polyethylene is present in the composition in the range of about 50 to about 90 weight %.

10. The composition of claim 6 wherein the additional polymer is the ethylene copolymer.

11. The composition of claim 10 wherein the additional polymer is an ethylene alkyl acrylate copolymer or ethylene alkyl methacrylate copolymer.

12. The composition of claim 11 wherein the additional polymer is ethylene methyl acrylate copolymer or ethylene methyl methacrylate copolymer.

13. The composition of claim 11 further comprising a polyol, ester of polyol polyalkylene glycol, or ester polyalkylene glycol.

14. The composition of claim 13 wherein the polyol is glycerol, polyglycerol or pentaerythritol; the polyalkylene glycol is polyethylene glycol or polypropylene glycol; and the ester is polyethylene glycol glycerin ester, glycerol monostearate, glycerol distearate, or glycerol tristearate.

15. An article comprising or produced from a composition wherein the article includes monolayer film or sheet, multilayer film, multilayer sheet, multilayer laminate, molded part, or combinations of two or more thereof and the composition is as recited in claim 1.

16. The article of claim 15 wherein the E/X/Y copolymer does not contain Y.

17. The article of claim 15 wherein the composition is a surface layer of the article.

18. The article of claim 15, 16, or 17 wherein the article has two surface layers and one or both of the layers comprises the composition and the composition further one or more additional polymers.

19. The article of claim 18 wherein the article is the multilayer film, the multilayer sheet, or the multilayer laminate; the article has two surface layers and at least one intermediate layer; and the the additional polymer is polyethylene, ethylene methyl acrylate copolymer, or ethylene methyl methacrylate copolymer.

20. The article of claim 19 wherein the intermediate layer comprises the composition the intermediate layer is in contact with a surface layer.

* * * * *